United States Patent
Chiang et al.

(10) Patent No.: US 6,785,670 B1
(45) Date of Patent: Aug. 31, 2004

(54) AUTOMATICALLY INITIATING AN INTERNET-BASED SEARCH FROM WITHIN A DISPLAYED DOCUMENT

(75) Inventors: Alice Chiang, Portola Valley, CA (US); John C. Hurd, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/527,300

(22) Filed: Mar. 16, 2000

(51) Int. Cl.[7] .............................................. G06F 17/30
(52) U.S. Cl. ...................... 707/3; 707/2; 707/4; 707/5; 707/6; 707/104
(58) Field of Search ............................ 707/4, 3, 5, 10, 707/103, 513, 530, 104, 1, 100, 2; 345/333, 349; 395/200.47

(56) References Cited

U.S. PATENT DOCUMENTS

| | | | |
|---|---|---|---|
| 5,634,051 A | | 5/1997 | Thomson ..................... 395/605 |
| 5,708,825 A | | 1/1998 | Sotomayor .................. 395/762 |
| 5,768,578 A | * | 6/1998 | Kirk et al. ................... 707/100 |
| 5,781,904 A | * | 7/1998 | Oren et al. .................. 707/100 |
| 5,802,530 A | | 9/1998 | Van Hoff ..................... 707/513 |
| 5,842,206 A | | 11/1998 | Sotomayor ..................... 707/5 |
| 5,864,846 A | * | 1/1999 | Voorhees et al. .............. 707/5 |
| 5,864,863 A | * | 1/1999 | Burrows ...................... 707/103 |
| 5,873,077 A | * | 2/1999 | Kanoh et al. .................. 707/3 |
| 5,877,765 A | | 3/1999 | Dickman et al. ........... 345/349 |
| 5,905,492 A | | 5/1999 | Straub et al. ............... 345/333 |
| 5,907,837 A | | 5/1999 | Ferrel et al. .................... 707/3 |
| 5,913,215 A | | 6/1999 | Rubinstein et al. ........... 707/10 |
| 5,918,013 A | | 6/1999 | Mighdoll et al. ...... 395/200.47 |
| 5,920,859 A | * | 7/1999 | Li ................................... 707/5 |
| 6,026,409 A | * | 2/2000 | Blumenthal ................. 707/104 |
| 6,078,916 A | * | 6/2000 | Culliss .......................... 707/5 |
| 6,175,830 B1 | * | 1/2001 | Maynard ........................ 707/5 |
| 6,269,362 B1 | * | 7/2001 | Broder et al. .................. 707/4 |
| 6,272,484 B1 | * | 8/2001 | Martin et al. .................. 707/1 |
| 6,338,059 B1 | * | 1/2002 | Fields et al. .................... 707/4 |
| 6,341,306 B1 | * | 1/2002 | Rosenschein et al. ....... 709/217 |
| 6,349,595 B1 | * | 2/2002 | Tedesco et al. ................ 707/3 |
| 6,360,215 B1 | * | 3/2002 | Judd et al. ...................... 707/3 |
| 6,374,275 B2 | * | 4/2002 | Wasilewski ................. 707/530 |
| 6,510,406 B1 | * | 1/2003 | Marchisio ...................... 704/9 |
| 6,519,586 B2 | * | 2/2003 | Anick et al. ................... 707/3 |
| 6,519,631 B1 | * | 2/2003 | Rosenschein et al. ....... 709/217 |

OTHER PUBLICATIONS

Schuetze et al., "System and method for quantitatively representing data objects in vector space", US Patent Application Publication, Apr. 2003, pp. 1–47.*

Marchisio, "Inverse inference engine for high performance web search", US Patent Application Publication, Nov. 2003, pp. 1–31.*

Wen–Syan Li et al., "WebDB: A Web query system and its modeling, language, and implementation", IEEE, 1998, pp. 216–227.*

Chakrabarti et al., "Mining the Web's link structure", IEEE, 1999, pp. 60–67.*

* cited by examiner

Primary Examiner—Thuy N. Pardo
(74) Attorney, Agent, or Firm—Samuel A. Kassatly

(57) ABSTRACT

A system for automatically initiating an Internet-based search from within a document displayed by a document viewer includes a search term designation module configured to receive a user designation of at least one word of the document; a search engine access module configured to automatically access a search engine; a search engine interfacing module configured to automatically provide the search engine with the at least one designated word; and a search initiation module configured to automatically direct the search engine to perform the Internet-based search using the at least one designated word as a search term.

41 Claims, 8 Drawing Sheets

AUTOMATICALLY INITIATING AN INTERNET-BASED SEARCH FROM WITHIN A DISPLAYED DOCUMENT

BACKGROUND OF THE INVENTION

1. Field of the Invention

The present invention relates generally to Internet search techniques, and more particularly, to a system and method for automatically initiating an Internet-based search from within a document displayed by a document viewer.

2. Identification of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Relevant Technologyy

The World Wide Web (hereinafter referred to as the "Web") is a collection of servers within the Internet from which specially formatted documents may be retrieved by means of a Web browser. Typically, Web documents are formatted in the HyperText Markup Language (HTML), which supports hyperlinks between and within documents, as well as a variety of multimedia elements, including graphics, audio and video.

A Web browser is a client application that allows a user to selectively retrieve and display HTML documents, as well as to selectively follow hyperlinks. Currently, two of the most popular Web browsers are Netscape Navigator™ and Microsoft Internet Explorer™.

A hyperlink is an element within an HTML document that directs the Web browser to another place in the same document, or to an entirely different document, when the hyperlink is followed. Hyperlinks may be attached to words, phrases, icons, and other objects displayed within the document. Typically, a user may follow a hyperlink by "clicking" on the hyperlink with a pointing device, such as a mouse. Hyperlinks are an essential part of any hypertext system, of which the Web is the most prominent example.

Documents are identified within the Web by a Uniform Resource Locator (URL), also commonly referred to as a Web address. A URL identifies the domain name or Internet Protocol (IP) address of the Web server containing the document, as well as the location of the document within the server.

In recent years, the Web has grown to include millions of individual Web documents relating to an almost limitless variety of subjects. One challenge has been to provide a means for users to locate documents within the ever expanding Web.

A search engine is a computer program that searches a database for documents that include user-supplied keywords and returns the locations within the database at which matching documents may be found. In the context of the Internet, a search engine may scan an index of Web documents for user-supplied keywords and return the URL of each matching Web document.

Internet search engines generally provide an HTML interface for receiving keywords from a user and displaying search results. A variety of Internet search engines are currently available, including Altavista™, Excite™, HotBot™, Lycos™, Infoseek™, and others.

Recently, Internet search engines have been developed to search different kinds of databases, such as legal databases (Westlaw™, Lexis™, IBM Intellectual Property Network™), news and reference databases (Deja™, Webopedia™), retail databases (Amazon™), and the like.

Often, while reading a Web document, a user identifies a word or phrase for which the user would like additional information. Ideally, the designer of the Web document anticipated the user's interest and included a hyperlink to a list of Web documents related to the word or phrase.

Realistically, however, such a hyperlink is not included. As a result, the user may choose to employ one of the above-described search engines to generate such a list of related Web documents. To do so, however, the user must manually direct a Web browser to the search engine, type the desired word or phrase, and manually initiate the search by clicking on a "Search" button or the like.

Unfortunately, many users find the above-described process too time-consuming or complicated for casually looking up words and phrases of interest. Moreover, if the same Web browser performs the search as was used to display the document including the desired word or phrase, the user's visual and mental context is lost each time the search engine interface replaces the Web document in the browser. To return to the original Web document and restore the user's context, the user must typically click on a "Back" button, or the like, introducing yet another step into the process. Moreover, it is frequently impossible to restore the user's context to the state in which it existed before the search was performed.

Accordingly, what is needed is a system and method for automatically initiating an Internet-based search from within a document displayed by a document viewer, such as a Web browser or the like. What is also needed is a system and method for maintaining the user's visual and mental context while performing an Internet-based search.

SUMMARY OF THE INVENTION

The present invention solves many or all of the foregoing problems by introducing a system and method by a which a user can automatically initiate an Internet-based search from within a document displayed by a document viewer, while maintaining the user's visual and mental context throughout the search.

In one aspect of the invention, a system includes a search term designation module adapted to receive a user designation of at least one word of the document; a search engine access module for automatically accessing a search engine; a search engine interfacing module adapted to automatically provide the search engine with the at least one designated word; and a search initiation module adapted to automatically direct the search engine to perform the Internet-based search using the at least one designated word as a search term.

In another aspect of the invention, a method for automatically initiating an Internet-based search from within a document displayed by a document viewer includes the steps of receiving a user designation of at least one word of the document; automatically accessing a search engine; automatically providing the search engine with the at least one selected word; and automatically directing the search engine to initiate the Internet-based search using the at least one selected word as a search term.

In yet another aspect of the invention, an article of manufacture comprises a program storage medium readable by a processor and embodying one or more instructions executable by the processor to perform the above-described method for automatically initiating an Internet-based search from within a document displayed by a document viewer.

These and other objects, features, and advantages of the present invention will become more fully apparent from the following description and appended claims, or may be learned by the practice of the invention as set forth hereinafter.

BRIEF DESCRIPTION OF THE DRAWINGS

These and other more detailed and specific objects and features of the present invention are more fully disclosed in the following specification, with reference to the accompanying drawings, in which.

DETAILED DESCRIPTION OF THE PREFERRED EMBODIMENTS

A preferred embodiment of the invention is now described with reference to the Figures, where like reference numbers indicate identical or functionally similar elements. The components of the present invention, as generally described and illustrated in the Figures, may be implemented in a variety of ways. Thus, the following more detailed description of the embodiments of the system and method of the present invention, as represented in the Figures, is not intended to limit the scope of the invention, as claimed, but is merely representative of presently preferred embodiments of the invention.

Throughout the following description, various components of the invention are described as "modules." In one embodiment, the modules may be implemented as software, hardware, firmware, or any combination thereof.

For example, as used herein, a module may include any type of computer instruction or computer executable code located within a memory device and/or transmitted as electronic signals over a system bus or network. An identified module may, for instance, comprise one or more physical or logical blocks of computer instructions, which may be organized as an object, a procedure, a function, or the like.

The identified modules need not be located together, but may comprise disparate instructions stored in different locations, which together implement the described functionality of the module. Indeed, a module may comprise a single instruction, or many instructions, and may even be distributed among several discrete code segments, within different programs, and across several memory devices.

Figure 1:
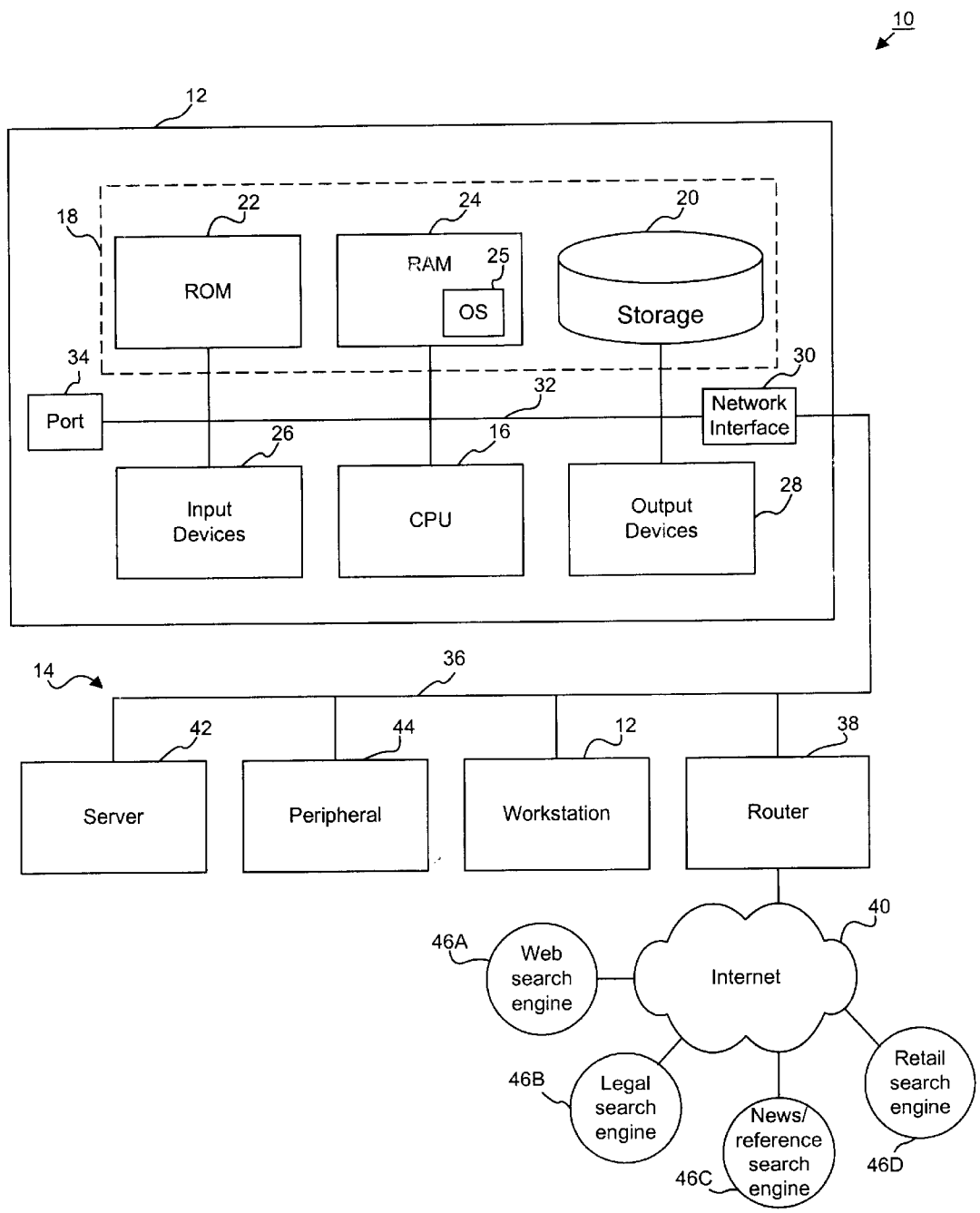
FIG. 1 is a schematic block diagram of a computer system suitable for implementing one embodiment of the invention.

FIG. 1 is a schematic block diagram illustrating a computer system 10 in which a plurality of modules may be hosted on one or more computer workstations 12 connected via a network 14. The network 14 may comprise a wide area network (WAN) or local area network (LAN) and may also comprise an interconnected system of networks, one particular example of which is the Internet.

A typical computer workstation 12 may include a central processing unit (CPU) 16. The CPU 16 may be operably connected to one or more memory devices 18. The memory devices 18 are depicted as including a non-volatile storage device 20, such as a hard disk drive or CD-ROM drive, a read-only memory (ROM) 22, and a random access memory (RAM) 24.

Preferably, the computer workstation 12 operates under the control of an operating system (OS) 25, such as OS/2™, WINDOWS NT™, WINDOWS 98™, UNIX™, or the like. In one embodiment, the OS 25 provides a graphical user interface (GUI) to enable the user to visually interact with the modules of the present invention. In one embodiment, the OS 25 may be loaded from the storage 20 into the RAM 24 at the time the workstation 12 is booted.

The workstation 12 may also include one or more input devices 26, such as a mouse and/or a keyboard, for receiving inputs from a user. Similarly, one or more output devices 28, such as a monitor and/or a printer, may be provided within, or be accessible from, the workstation 12.

A network interface 30, such as an Ethernet adapter, may be provided for coupling the workstation 12 to the network 14. Where the network 14 is remote from the computer workstation 12, the network interface 30 may comprise a modem, and may connect to the network 14 through a local access line, such as a telephone line.

Within any given workstation 12, a system bus 32 may operably interconnect the CPU 16, the memory devices 18, the input devices 26, the output devices 28, the network interface 30, and one or more additional ports 34, such as parallel ports and/or RS-232 serial ports.

The system bus 32 and a network backbone 36 may be regarded as data carriers. Accordingly, the system bus 32 and the network backbone 36 may be embodied in numerous configurations, such as wire and/ or fiber optic lines, as well as "wireless" electromagnetic links using visible light, infrared, and radio frequencies.

In general, the network 14 may comprise a single local area network (LAN), a wide area network (WAN), several adjoining networks, an intranet, an extranet, or as in the manner depicted, a system of interconnected networks such as the Internet 40. The individual workstations 12 may communicate with each other over the backbone 36 and/or over the Internet 40 using various communication techniques.

For instance, different communication protocols, e.g., ISO/OSI, IPX, TCP/IP, may be used within the network 14. In the case of the Internet 40, however, a layered communications protocol (i.e. TCP/IP) generally best enables communications between the differing networks 14 and workstations 12.

The workstations 12 may be coupled via the network 14 to application servers 42, and/or other resources or peripherals 44, such as scanners, digital cameras, fax machines, and the like. External networks, such as the Internet 40, may be coupled to the network 14 through a router 38.

In one embodiment, a number of search engines 46 may be accessible to a workstation 12 via the Internet 40. As previously noted, a search engine 46 is a computer program that searches a database for documents that include user-supplied keywords and returns the locations within the database at which matching documents may be found. In the context of the Internet, a search engine may scan an index of Web documents for user-supplied keywords and return the URL of each matching Web document.

For example, the search engines 46 may include one or more Web search engines 46A, such as such as Altavista™, Excite™, HotBot™, Lycos™, Infoseek™, and the like. The search engines 46 may also include one or more legal search engines 46B, such as Westlaw™, Lexis™, the IBM Intellectual Property Network™, and the like. In addition, the search engines 46 may include one or more news and reference search engines 46C, such as Deja™, Webopedia™, and the like. Moreover, the search engines 46 may include one or more retail search engines 46D, such as Amazon™ and the like. A variety of other search engines 46 are possible within the scope of the present invention.

Figure 2:
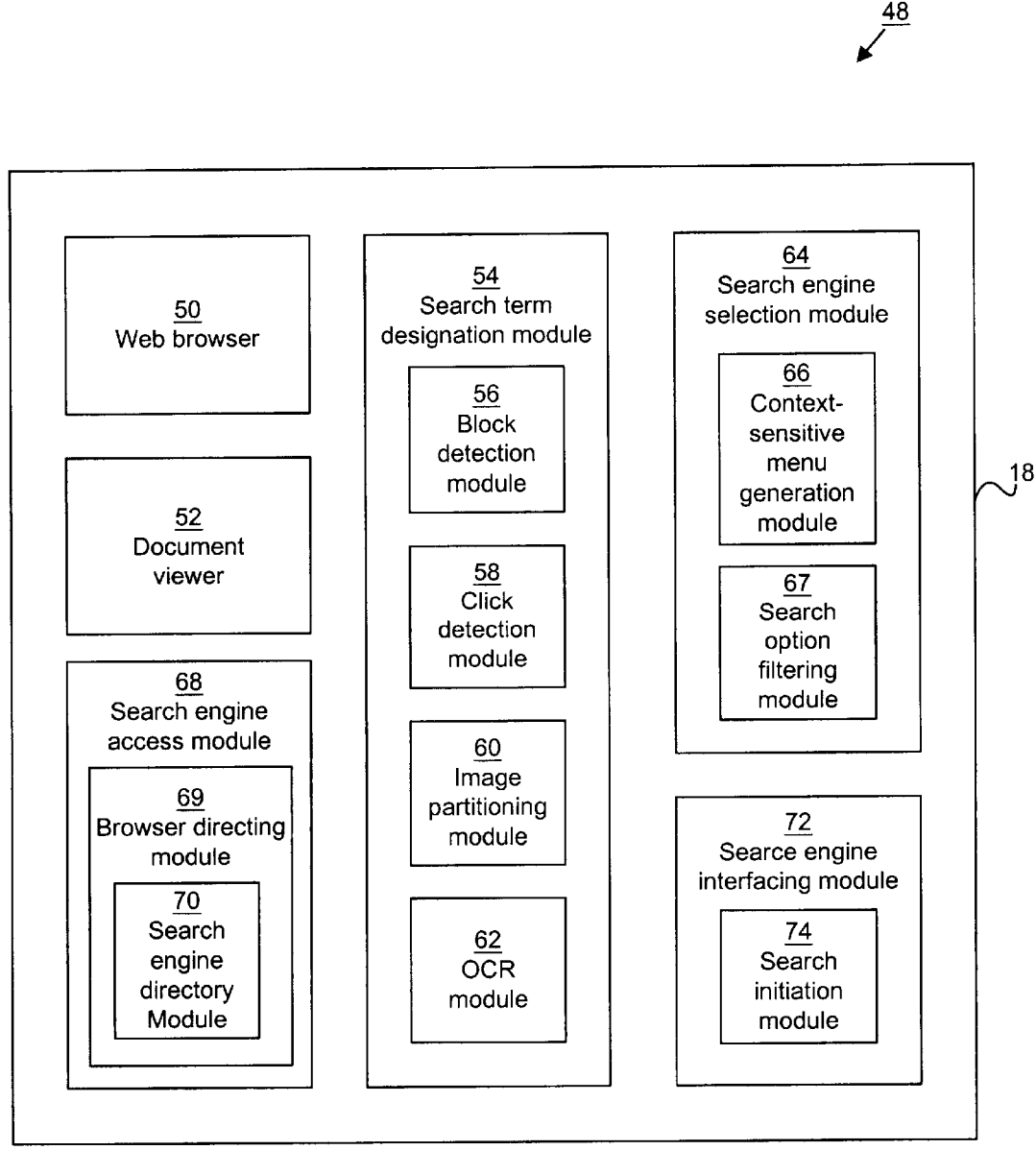
FIG. 2 is a schematic block diagram the components of a system for automatically initiating an Internet-based search from within a displayed document according to one embodiment of the invention.

Referring now to FIG. 2, the memory devices 18 are depicted as including an automatic search initiation system 48. In one embodiment, the system 48 includes a plurality of modules containing executable code for performing the methods of the present invention. The memory devices 18 in which the modules are located may be located within a single workstation 12, or may be distributed among a plurality of workstations 12 coupled via the network 14. Although the modules are described herein as separate functional units, the various modules may be combined or integrated into a single software application or device. Likewise, the functionality of any one module may be implemented using two or more modules.

In one embodiment, the system 48 may include a Web browser 50, such as Netscape Navigator™ or Microsoft Internet Explorer™. However, as used herein, a browser 50 may include any client application configured to access a search engine 46.

The system 48 may also include a document viewer 52. In one embodiment, the document viewer 52 may comprise a conventional Web browser, although other implementations are possible. For example, in an alternative embodiment, the document viewer 52 may comprise a word processor, such as Microsoft Word™, or a portable document format (PDF) reader, such as Adobe Acrobat™.

Figure 5:
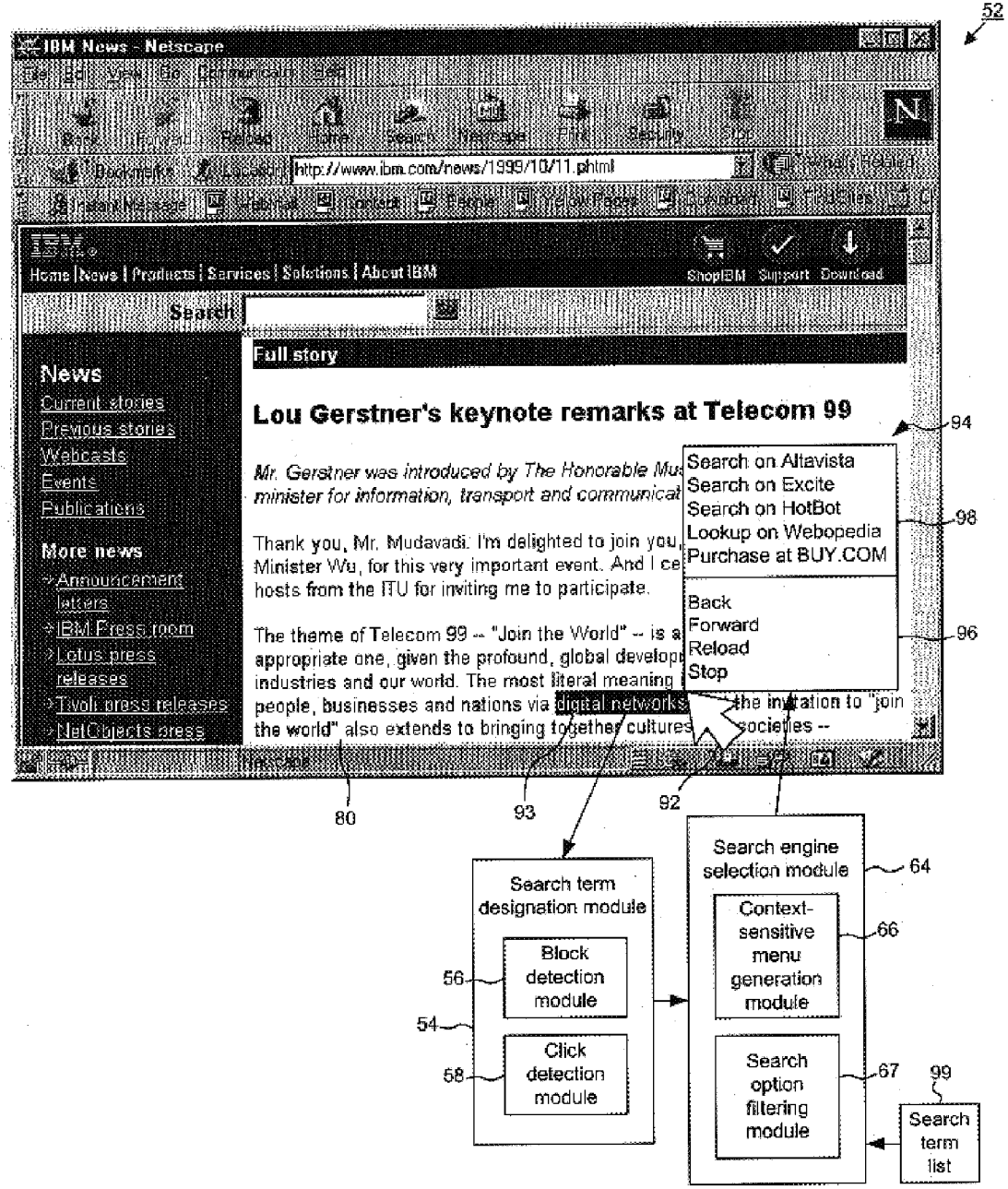
FIG. 5 is an illustration of a document viewer, a search term designation module, a search engine selection module, and a search term list according to one embodiment of the invention.

Preferably, the system 48 may also include a search term designation module 54, which is described in greater detail in relation to FIG. 5. For ease of description, the search term designation module 54 is depicted as including a block detection module 56, a click detection module 58, an image partitioning module 60, and an optical character recognition (OCR) module 62. However, in alternative embodiments, the foregoing modules may exist independently of the search term designation module 54.

Preferably, the system 48 may also include a search engine selection module 64, which is described in greater detail in relation to FIG. 5. The search engine selection module 64 is depicted as including a context-sensitive menu generation module 66 and a search option filtering module 67, although the three modules 64, 66, 67 may exist independently in one embodiment.

Figure 6:
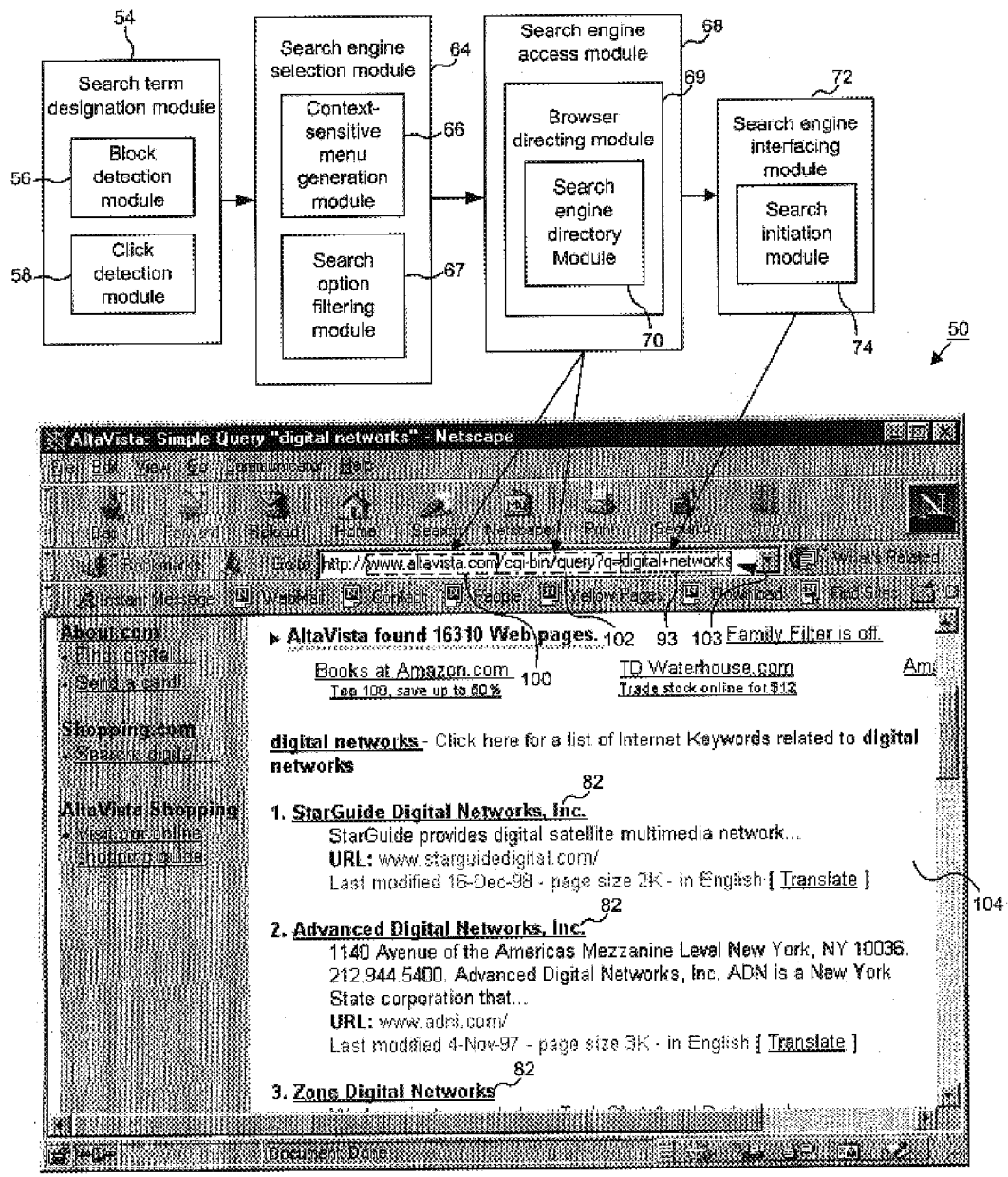
FIG. 6 is an illustration of a Web browser, a search term designation module, a search engine selection module, a browser directing module, and a search engine interfacing module according to one embodiment of the invention.

Additionally, the system 48 may include a search engine access module 68, which is described in greater detail in relation to FIG. 6. The search engine access module 68 is depicted as including a browser directing module 69, which, in one embodiment, includes a search engine directory module 70. However, in alternative embodiments, the three modules 68, 69, 70 may exist independently of each other.

The system 48 may also include a search engine interfacing module 72, which is described more fully in relation to FIG. 6. The search engine interfacing module 72 is depicted as including a search initiation module 74, although the two modules 72, 74 may exist independently in one embodiment.

Each of the above-identified modules may be implemented, for example, as plug-ins, ActiveX™ controls, and/or Java™ applets in conjunction with the document viewer 52, although a variety of other implementations are possible within the scope of the invention. Those skilled in the art will recognize that some of the above-described modules may be implemented within portions of the operating system 25.

Figure 3:
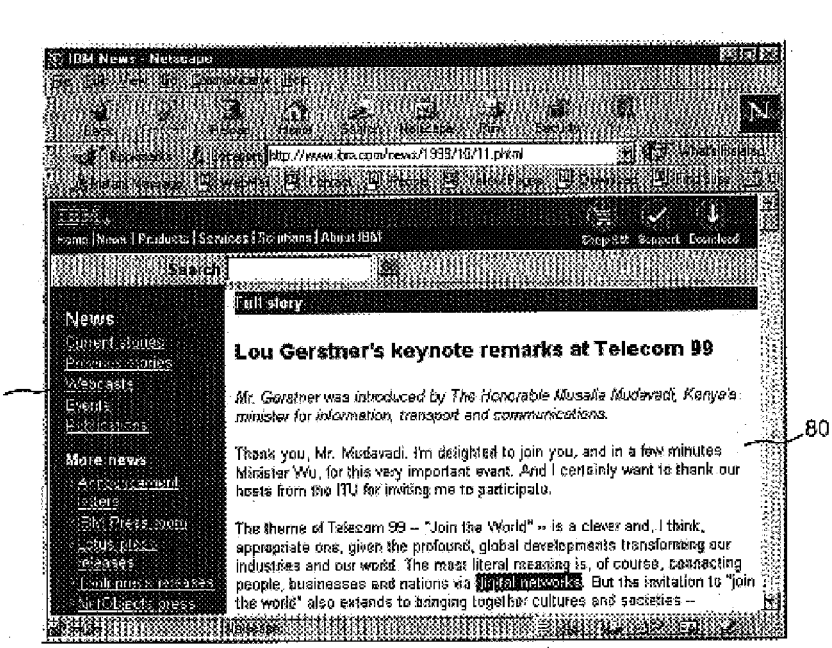
FIG. 3 is an illustration of a document viewer according to one embodiment of the invention.

Referring now to FIG. 3, a document viewer 52 is depicted as displaying a document 80. In one embodiment, the document viewer 52 is a conventional Web browser, and the document 80 is a Web document, although the invention is not limited in this respect.

The document 80 may be encoded in the HyperText Markup Language (HTML), and may include one or more displayable elements, including words, graphical objects, and the like. Some of the displayable elements may comprise hyperlinks 82, which, when activated, may direct the dosument viewer 52 to a different portion of the same document 80, or to an entirely different document 80. As illustrated in FIG. 3, a typical document viewer 52 underlines hyperlinked text to distinguish a hyperlink 82 from regular text.

As previously noted, a user may, while reading the document 80, identify a word or phrase for which the user would like additional information. For instance, as shown in FIG. 3, a user may desire additional information related to "digital networks." ideally, the designer of the Web document 80 anticipated the user's interest and included a hyperlink 82 to a list of related Web documents 80.

Figure 4:
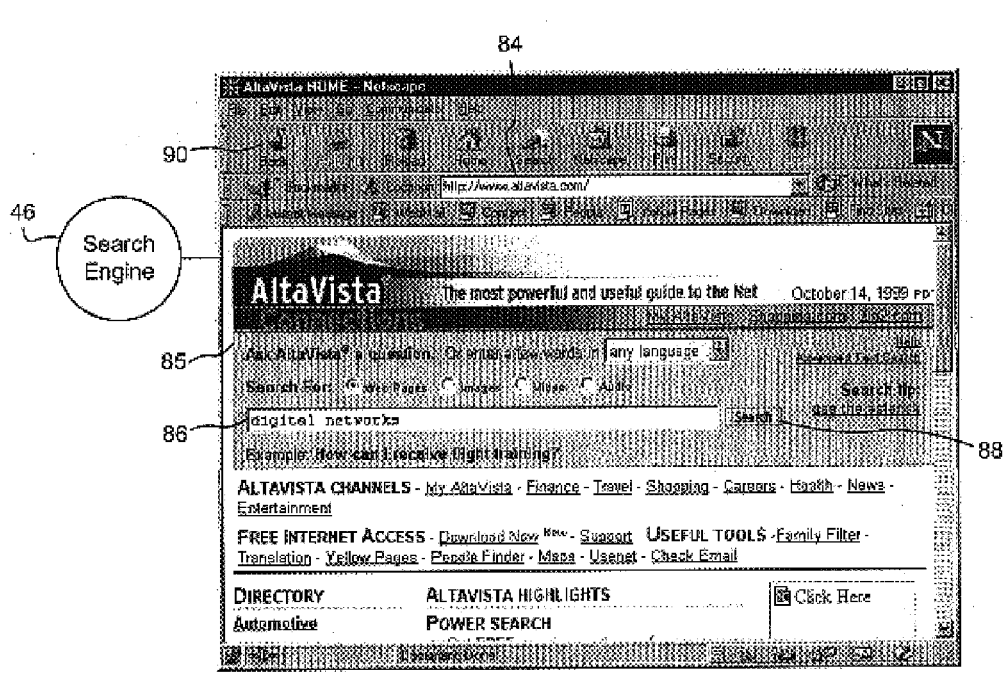
FIG. 4 is an illustration of a Web browser according to one embodiment of the invention, including a schematic connection to a search engine.

Realistically, however, such as a hyperlink 82 is frequently not included. As a result, as illustrated in FIG. 4, the user may choose to employ a search engine 46 to generate a list of Web documents 80 related to "digital networks."

To do so, however, the user typically begins by manually directing a Web browser 50 to the desired search engine 46, such as by typing the URL of the search engine 46, i.e. "www.altavista.com," into a location field 84. The Web browser 50 responds by displaying a search engine interface 85, which is an HTML document including code for interacting with the search engine 46.

Thereafter, the user generally types the desired word or phrase, i.e. "digital networks," into a search field 86 provided by the search engine interface 85. Finally, the user manually initiates the search by clicking on a "Search" button 88 or the like, also provided by the search engine interface 85.

Unfortunately, many users may find the above-described process too time-consuming or complicated for casually looking up words or phrases of interest. Moreover, if the document viewer 52 functions as the Web browser 50, the user's context is lost each time the search engine interface replaces the Web document 80 in the browser 50. To return to the original Web document 80 and restore the user's context, the user must typically click on a "Back" button 90, or the like, introducing yet another step into the process. Moreover, it is frequently impossible to restore the user's context to the state in which it existed before the search was performed.

Accordingly, in order to solve these problems, the present invention provides a system and method by a which a user can automatically initiate an Internet-based search from within a document 80 displayed by a document viewer 52, while maintaining the user's context throughout the search.

In accordance with the present invention, as illustrated in FIG. 5, a user initially designates one or more words of a document 80. Preferably, the user does so by blocking, highlighting or otherwise marking the designated words within a document viewer 52. Typically, document viewers 52 provide mechanisms for blocking or highlighting text, although such mechanisms are provided for reasons apart from initiating an Internet-based search.

A user may, for instance, position a pointer 92, by means of a mouse or other pointing device, on the first desired word (i.e. "digital") and, while holding down the left mouse button, drag the pointer 92 to the last desired word (i.e. "networks"). As a result, a typical document viewer 52 will block or highlight the words "digital networks." Preferably, the user may confirm his or her designation of words by clicking the right mouse button or the like. In one embodiment, the designated words do not comprise hyperlinks 82, since hyperlinks 82 may conventionally be used to provide a link to additional information about an associated word or words.

In an alternative embodiment, the user may designate a single word by simply positioning the pointer 92 over the designated word and clicking the right mouse button. In yet another embodiment, the middle mouse button (if available), or other standard Windows™-type mechanisms may be used for the same purpose. In still another embodiment, right clicking twice on a word, within Windows™-type environments, causes the word to be blocked or highlighted.

In one embodiment, the search term designation module 54 receives the user-designated word or words, referred to hereafter as search term(s) 93, by means of the block detection module 56 and the click detection module 58. For example, the block detection module 56 may detect blocked or highlighted search terms 93. Similarly, where a user has clicked on a single word with the right mouse button, the click detection module 58 may detect the search term 93.

After the user has confirmed the selection of the search terms 93 by clicking the right mouse button or the like, the search engine selection module 64, in one embodiment, prompts the user to select a search engine 46 to perform the Internet-based search. In one embodiment, the context-sensitive menu generation module 66 generates a context-sensitive menu 94 within the document viewer 52 including one or more search engine 46 choices.

Conventionally, a context-sensitive menu 94 is displayed whenever a user clicks the right mouse button within a Microsoft Windows™-compatible application. The context-sensitive menu 94 may include a variety of standard options 96, depending, for example, on the type of the application, the state of the application, the location of the pointer 92 within the application when the right mouse button is clicked, and the like. For example, as shown in FIG. 5, the context-sensitive menu 94 within a Web document viewer 52 may display a variety of standard options 96, such as "Back," "Forward," "Reload," "Stop," and the like.

In one embodiment, the context-sensitive menu generation module 66 adds one or more search options 98 to the standard context-sensitive menu 94. Each search option 98 may, for example, correspond to a search engine 46 by which the Internet-based search may be performed. For example, as illustrated in FIG. 5, the search options 98 include:

Search on Altavista

Search on Excite

Search on HotBot

Lookup on Webopedia

Purchase on BUY.COM

A wide variety of additional search options 98 may also be provided within the scope of the invention. Preferably, the search options 98 are separated from the standard options 96 within the context-sensitive menu 94, and may be displayed first within the context-sensitive menu 94 for convenience of selection.

In one embodiment, the search options 98 are predefined to include a number of the most popular search engines 46. In an alternative embodiment, the search options 98 are user-customizable. In yet another embodiment, the context menu includes a generic "Search" option, which, when selected, prompts the user to type the name of a desired search engine 46. For example, the user may type "Altavista," which the search engine selection module 64 may interpret as "www.altavista.com."

In still another embodiment, a search option filter module 67 consults an initial set of search options 98 to select a final set of the search options 98 to be displayed in the context-sensitive menu 94. In some cases, the number of possible search options 98 may exceed the number that may be conveniently displayed within the context-sensitive menu 94. Thus, the search options 98 may be automatically chosen by the search option filter module 67, based on selected criteria, such as the user-selected search terms 93.

For instance, if the search terms 93 include "U.S. Patent Number," a search option 98 such as "Search on IBM Patent Server" may be included in the context-sensitive menu 94. Likewise, if the designated words include "$13\text{—}F.3d_{13\text{—}}$," a search option 98 such as "Search on LEXIS" may be included in the context-sensitive menu 94.

In one embodiment, the search option filtering module 67 accesses one or more search term lists 99, which correlate various search terms 93 to particular search options 98. For example, technical search terms 93, such as "digital networks," may be included within a search term list 99 corresponding to an on-line encyclopedia, such as Webopedia™. Thus, if the search terms 93 include a term such as "digital networks," the search option filtering module 67 may include a "Lookup on Webopedia" search option 98 in the context-sensitive menu 94.

After the context-sensitive menu 94 is displayed, the user may select one of the search options 98, for example, by moving the pointer 92 over the desired search option 98 and clicking the left mouse button.

Thereafter, as illustrated in FIG. 6, the search engine access module 68 automatically accesses the selected search engine 46. In one embodiment, a search engine 46 is accessed when the browser directing module 69 automatically directs a Web browser 50 to the search engine 46 corresponding to the selected search option 98. As used herein, the term "automatically" indicates an operation performed by a module of the above-described system 48 without requiring user intervention.

In one embodiment, the search engine directory module 70 provides the Web browser 50 with the domain name 100 (or IP address) of the selected search engine 46. Preferably, the search engine directory module 70 stores a domain name 100 for each search option 98. For instance, if the user selects the "Search on Altavista" search option 98 of FIG. 5, the search engine directory module 70 preferably provides the Web browser 50 with the domain name 100, "www.altavista.com."

In addition, the search engine directory module 70 preferably provides the search engine 46 (via the Web browser 50) with the appropriate query command 102 to initiate the Internet-based search. For example, the command 102, "/cgi-bin/query?q=", may be used within the Altavista™ search engine 46 to initiate a simple query. Many query commands 102, such as the one illustrated above, are executed via the Common Gateway Interface (CGI), which is a specification for transferring information between a Web browser 50 and a program, such as a Database Management System (DBMS).

Finally, in one embodiment, the search engine interfacing module 72 automatically provides the search engine 46 (via the Web browser 50) with tnhe user-selected search term(s) 93 in a format dictated by the search engine directory module 70 for the particular search engine 46. For instance, as shown in FIG. 6, the search terms 93, "digital networks", are formatted according to the requirements of the Altavista™ search engine 46 as "digital+networks".

Preferably, the domain name 100, the query command 102, and the search terms 93 together form a Uniform Resource Locator (URL) 103. Thus, in one embodiment, the search initiation module 74 sends the URL 103 to the Web browser 50 to initiate the Internet-based search. As shown in FIG. 6, providing the URL, "www.altavista.com/cgi-bin/query?q=digital+networks," to the Web browser 50 causes the search engine 46 to generate a set of search results 104, including a plurality of hyperlinks 82 to Web documents 80 related to the search terms 93, i.e. "digital networks."

Unlike conventional systems, however, the user is not required to manually direct the Web browser 50 to the search engine 46, type the search terms 93, and click on the "Search" button 88. Instead, the user need only to block or highlight the search terms 93 within the document 80 and select the desired search engine 46 from a context-sensitive menu 94. The search results 104 are then automatically generated, preferably in a manner that is transparent to the user.

Moreover, in a preferred embodiment, the user's context within the original document 80 may be maintained throughout the search. In one embodiment, where the document viewer 52 is also Web browser 50, the document viewer 52, itself, may be directed to the search engine 46. However, this would have the effect of completely replacing the document 80 in the document viewer 52 with the search engine interface 85, causing the user to lose his or her context.

Figure 7:
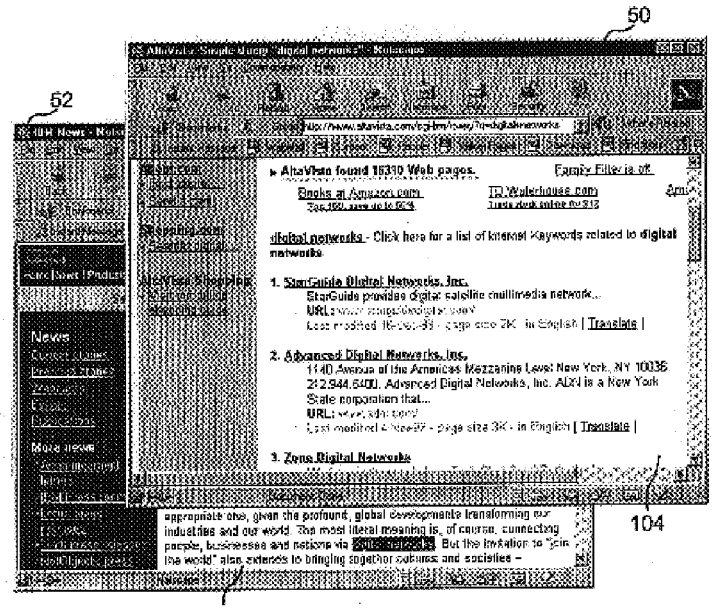
FIG. 7 is an illustration of a document viewer and a Web browser according to one embodiment of the invention.

In a preferred embodiment, however, the browser directing module 69 or the like automatically generates a new instance of a Web browser 50 in which to perform the Internet-based search, thus maintaining the user's context within the original document 80. For example, as illustrated in FIG. 7, the new instance of the Web browser 50 may only partially overlap the document viewer 52. This embodiment may be necessary, for instance, where the user's displayable screen area is reduced due to operating in a low resolution. Nevertheless, both the document 80 and the search results 104 are visible at the same time.

Figure 8:
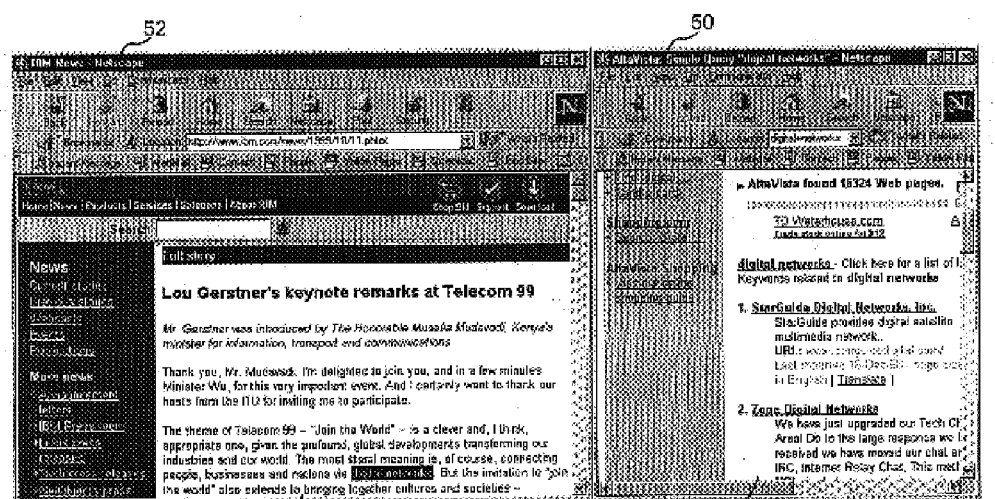
FIG. 8 is an illustration of a document viewer and a Web browser according to one embodiment of the invention.

In a preferred embodiment, as shown in FIG. 8, a user may have sufficient screen area to display the document viewer 52 in parallel with the new instance of the Web browser 50. Thus, the user may maintain his or her context within the document 80, while viewing the search results 104.

Figure 9:
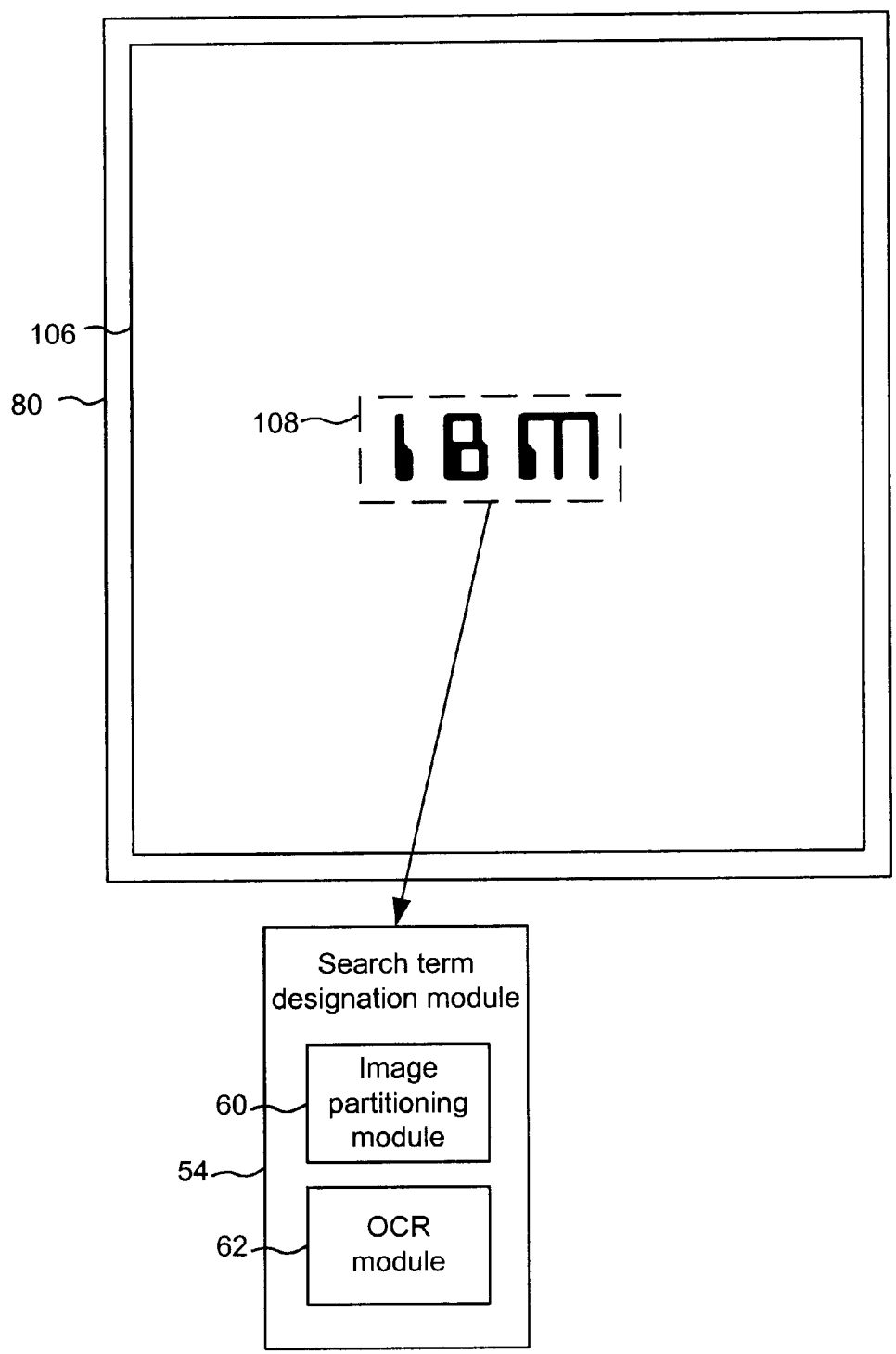
FIG. 9 is an illustration of an image and a user-selected image portion according to one embodiment of the invention.

As illustrated in FIG. 9, a document 80 may include, in certain instances, graphical objects that appear as text, but are actually bitmapped (raster) images 106. This is particularly common for stylized logos and the like, but is also frequently the case for entire pages of a document 80. In such cases, a typical document viewer 52 is not capable of blocking or highlighting the "words" contained within the images 106, such that the search term designation module 54 may identify the selected search terms 93.

Accordingly, in one embodiment, the image partitioning module 60 allows a user to partition the image 106 into a least one image portion 108. Preferably, the image partitioning module 60 allows the user to draw a box or the like around one or more desired "words" within an image 106. In one embodiment, the image partitioning module 60 returns the rectangular coordinates within the image 106 of the user-selected image portion 108.

Thereafter, the OCR module 62 may process the image portion 108 using standard optical character recognition techniques in order to recognize one or more search terms 93 contained therein. Optical character recognition systems are well known to those skilled in the art. After the search terms 93 are recognized, the system 48 may proceed as described above.

Figure 10:
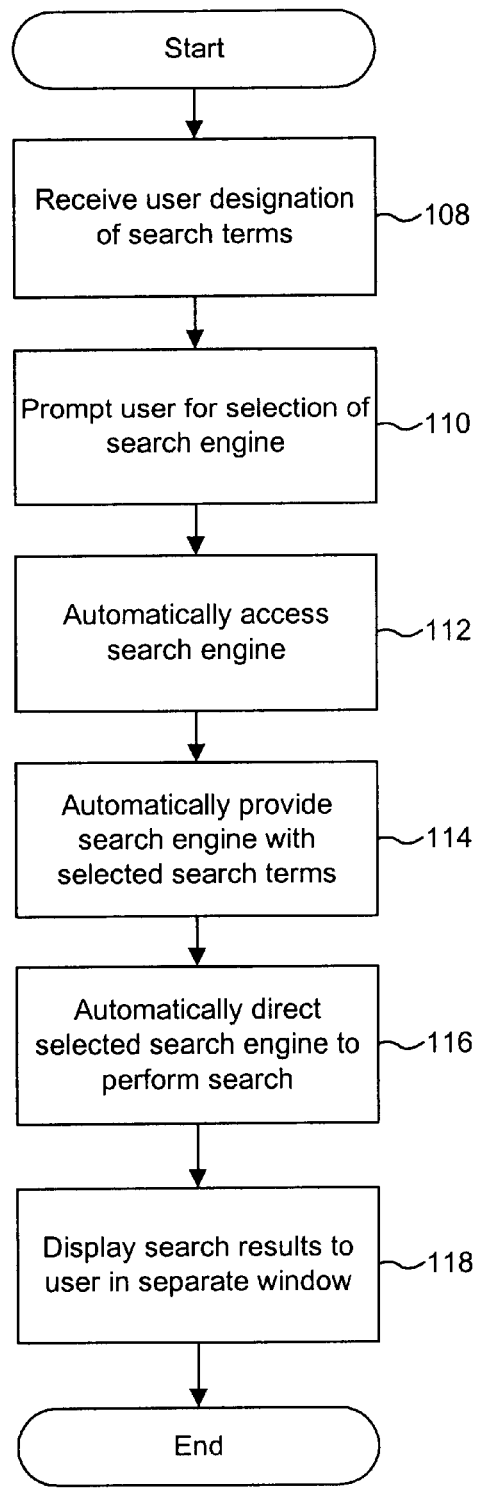
FIG. 10 is a schematic flowchart of a method for automatically initiating an Internet-based search from within a displayed document according to one embodiment of the invention.

Referring now to FIG. 10, a schematic flowchart illustrates a method for automatically initiating an Internet-based search from within a displayed document 80. The method begins by receiving 108 a user designation of one or more search terms 93 from a document 80 displayed by a document viewer 52.

The search terms may be designated in any suitable manner. For instance, the search terms may be selected, in one embodiment, by blocking or highlighting the search terms 93 and then by clicking the right mouse button or the like. In another embodiment, the user selects a single search term 93 by simply right clicking on a word.

After the search terms 93 are selected, the method continues by selecting a search engine 46 to perform the Internet-based search. In one embodiment, the user is prompted 110 for a selection of a search engine 46 to be used. As described above, the user may select the search engine 46 from a list within a context-sensitive menu 94, which is preferably displayed when the user clicks the right mouse button to confirm his or her selection of the search terms 93.

Once the search engine 46 is selected, the method continues by automatically accessing 112 the selected search engine 46. In one embodiment, search engine 46 is accessed by automatically directing a Web browser 50 to the selected search engine 46 by providing a new instance of a Web browser 50 with the URL of the search engine 46.

In addition, the selected search terms 93 are preferably automatically provided 114 to the search engine 46 (via the Web browser 50), after which the search initiation module 70 automatically directs 116 the selected search engine 46 to initiate the Internet-based search. Finally, the search results 104 produced by the search engine 46 are displayed 118 to the user, preferably in a separate window, after which the method is complete.

From the foregoing description, the present invention offers numerous advantages over conventional systems. For example, the user is not required to manually direct a Web browser 50 to the search engine 46, type the search terms 93, and click on the "Search" button 88. Instead, the user need only to block or highlight the search terms 93 within the document 80 and select the desired search engine 46 from a context-sensitive menu 94. The search results 104 are then automatically generated, preferably in a manner that is transparent to the user.

Moreover, in a preferred embodiment, the user's context within the original document 80 may be maintained throughout the search. The user may preferably view the document 80 and search results 104 at the same time using a suitable display device.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for automatically initiating a network-based search from within a document displayed by a document viewer, the document comprising one or more objects, the system comprising:

a search term designation module configured to receive a user designation of at least one object of the document;

a search engine access module configured to automatically provide a search engine address and a query command to a browser in response to the user designation of the at least one object;

a search engine interfacing module configured to automatically provide the browser with the at least one designated object;

wherein the browser automotically submits the query command and the at least one designated object to a search engine corresponding to the search engine address; and wherein the document comprises an image, the search term designation module comprising:

an image partitioning module configured to receive a user selection of a portion of the image; and an optical character recognition (OCR) module configured to perform optical character recognition on the selected portion of the image to recognize therein the at least one designated object.

2. The system of claim 1, wherein the document viewer is selected from the group consisting of a browser, a word processor, and a portable document format (PDF) reader.

3. The system of claim 1, wherein the document is selected from the group consisting of a Web document, a word processing document, and a portable document format (PDF) document.

4. The system of claim 1, wherein the search term designation module comprises:

a block detection module configured to permit a user to select the at least one word within the document by blocking the at least one designated word.

5. The system of claim 1, wherein the search term designation module comprises:

a click detection module configured to permit a user to select the at least one word within the document by clicking on the at least one designated word.

6. The system of claim 1, wherein the search engine access module comprises:

a browser directing module configured to automatically direct a browser to a search engine.

7. The system of claim 6, wherein the search engine comprises a uniform resource locator (URL), the browser directing module comprising:

a search engine directory module configured to provide the browser with the URL of the search engine.

8. The system of claim 6, wherein the browser directing module is further configured to automatically create a new instance of a browser to perform the Internet-based search.

9. The system of claim 6, wherein the browser directing module comprises:

a search engine selection module configured to prompt a user for a selection of at least one search engine to perform the Internet-based search and to receive from the user a selection of a search engine.

10. The system of claim 6, wherein the browser directing module comprises:

a search engine selection module configured to display to a user a context-sensitive menu including at least one choice of a search engine to perform the Internet-base search and to receive a user selection of a search engine from the context-sensitive menu.

11. The system of claim 1, wherein the search engine is configured to generate a set of search results, the browser configured to display the set of search results to a user.

12. The system of claim 11, wherein the document viewer is configured to display the document in a first window and the browser is configured to display the search results in a second window on a common display device.

13. A system for automatically initiating a network-based search from within a document displayed by a document viewer, the document comprising one or more objects, the system comprising:

a search term designation module configured to receive a user designation of at least one object of the document;

a search engine access module configured to automatically provide a search engine address and a query command to a browser in response to the user designation of the at least one object;

a search engine interfacing module configured to automatically provide the browser with the at least one designated object;

wherein the browser automatically submits the query command and the at least one designated object to a search engine corresponding to the search engine address;

wherein the search engine access module comprises a browser directing module configured to automatically direct a browser to the search engine;

wherein the browser directing module comprises a search engine selection module configured to display to a user a context-sensitive menu including at least one choice of a search engine to perform the network-based search and to receive a user selection of a search engine from the context-sensitive menu; and wherein the search engine selection module comprises a search option filter module configured to automatically make a selection of the at least one choice of a search engine to be included in the context-sensitive menu based on the at least one user-designated object.

14. A method for automatically initiating a network-based search from within a document displayed by a document viewer, the document comprising one or more objects, the method comprising:

receiving a user designation of at least one object of the document;

automatically providing a search engine address and a query command to a browser in response to the user designation of the at least one object;

automatically providing the browser with the at least one designated object;

wherein the browser automatically submits the query command and the at least one designated object to a search engine corresponding to the search engine address; and wherein the document comprises on image, and wherein receiving a user designation of at least one object of the document comprises:

receiving a user selection of a portion of the image; and performing optical character recognition on the selected portion of the image to recognize therein the at least one designated object.

15. The method of claim 14, wherein the document viewer is selected from the group consisting of a browser, a word processor, and a portable document format (PDF) reader.

16. The method of claim 14, wherein the document is selected from the group consisting of a Web document, a word processing document, and a portable document format (PDF) document.

17. The method of claim 14, wherein receiving a user designation of at least one word of the document comprises:

permitting a user to select the at least one word within the document by blocking the at least one designated word.

18. The method of claim 14, wherein receiving a user designation of at least one word of the document comprises:

permitting a user to select the at least one word within the document by clicking on the at least one designated word.

19. The method of claim 14, wherein accessing a search engine comprises:
   automatically directing a browser to a search engine.

20. The method of claim 19, wherein the search engine comprises a uniform resource locator (URL), and wherein directing a browser to a search engine comprises:
   providing the browser with the URL of the search engine.

21. The method of claim 19, wherein directing a browser to a search engine comprises:
   automatically creating a new instance of a browser to perform the Internet-based search.

22. The method of claim 19, wherein directing a browser to a search engine comprises:
   prompting a user for a selection of at least one search engine to perform the Internet-based search; and
   receiving from the user a selection of a search engine.

23. The method of claim 19, wherein directing a browser to a search engine comprises:
   displaying to a user a context-sensitive menu including a selection of at least one search engine to perform the Internet-based search; and
   receiving a user selection of a search engine from the context-sensitive menu.

24. The method of claim 14, wherein the search engine is configured to generate a set of search results, the method further comprising:
   displaying the set of search results to a user.

25. The method of claim 24, wherein displaying the set of search results to a user comprises:
   displaying the document in a first window provided by the document viewer; and
   displaying the search results in a second window provided by the browser on a common display device.

26. The article of manufacture of claim 24, wherein displaying the set of search results to a user comprises:
   displaying the document in a first window provided by the document viewer; and
   displaying the search results in a second window provided by the browser on a common display device.

27. A method for automatically initiating a network-based search from within a document displayed by a document viewer, the document comprising one or more objects, the method comprising:
   receiving a user designation of at least one object of the document;
   automatically providing a search engine address and a query command to a browser in response to the user designation of the at least one object;
   automatically providing the browser with the at least one designated object;
   wherein the browser automatically submits the query command and the at least one designated object to a search engine corresponding to the search engine address;
   wherein accessing the search engine comprises automatically directing a browser to the search engine;
   wherein directing the browser to the search engine comprises:
      displaying to a user a context-sensitive menu including a selection of at least one search engine to perform the network-based search;
      receiving a user selection of a search engine from the context-sensitive menu; and
   wherein displaying to the user the context-sensitive menu comprises automatically making a selection of the at least one choice of a search engine to include in the context-sensitive menu based on the least one user-designated object.

28. An article of manufacture comprising a program storage medium readable by a processor and embodying one or more instructions executable by the processor to perform a computer-implemented method for automatically initiating a network-based search from within a document displayed by a document viewer, the document comprising one or more objects, the method comprising:
   receiving a user designation of at least one object of the document;
   automatically providing a search engine address and a query command to a browser in response to the user designation of the at least one object;
   automatically providing the browser with the at least one designated object;
   wherein the browser automatically submits the query command and the at least one designated object to a search engine corresponding to the search engine address; and
   wherein the document comprises an image, and wherein receiving a user designation of at least one object of the document comprises:
   receiving a user selection of a portion of the image; and
   performing optical character recognition on the selected portion of the image to recognize therein the at least one designated object.

29. The article of manufacture of claim 28, wherein the document viewer is selected from the group consisting of a browser, a word processor, and a portable document format (PDF) reader.

30. The article of manufacture of claim 28, wherein the document is selected from the group consisting of a Web document, a word processing document, and a portable document format (PDF) document.

31. The article of manufacture of claim 28, wherein receiving a user designation of at least one word of the document comprises:
   permitting a user to select the at least one word within the document by blocking the at least one designated word.

32. The article of manufacture of claim 28, wherein receiving a user designation of at least one word of the document comprises:
   permitting a user to select the of least one word within the document by clicking on the at least one designated word.

33. The article of manufacture of claim 28, wherein accessing a search engine comprises:
   automatically directing a browser to a search engine.

34. The article of manufacture of claim 33, wherein the search engine comprises a uniform resource locator (URL), and wherein directing a browser to a search engine comprises:
   providing the browser with the URL of the search engine.

35. The article of manufacture of claim 33, wherein directing a browser to a search engine comprises:
   automatically creating a new instance of a browser to perform the Internet-based search.

36. The article of manufacture of claim 33, wherein directing a browser to a search engine comprises:
   prompting a user for a selection of least one search engine to perform the Internet-based search; and
   receiving from the user a selection of a search engine.

37. The article of manufacture of claim 33, wherein directing a browser to a search engine comprises:

displaying to a user a context-sensitive menu including a selection of at least one search engine to perform the Internet-based search; and receiving a user selection of a search engine from the context-sensitive menu.

38. The article of manufacture of claim 28, wherein the search engine is configured to generate a set of search results, the method further comprising:

displaying the set of search results to a user.

39. An article of manufacture comprising a program storage medium readable by a processor and embodying one or more instructions executable by the processor to perform a computer-implemented method for automatically initiating a network-based search from within a document displayed by a document viewer, the document comprising one or more objects, the method comprising:

receiving a user designation of at least one object of the document;

automatically providing a search engine address and a query command to a browser in response to the user designation of the at least one object;

automatically providing the browser with the at least one designated object;

wherein the browser automatically submits the query command and the at least one designated object to the search engine corresponding to the search engine address;

wherein accessing the search engine comprises automatically directing the browser to the search engine;

wherein directing the browser to the search engine comprises displaying to a user a context-sensitive menu including a selection of at least one search engine to perform the network-based search;

receiving a user selection of the search engine from the context-sensitive menu; and wherein displaying to the user the context-sensitive menu comprises automatically making a selection of the at least one choice of a search engine to include in the context-sensitive menu based on the least one user-designated object.

40. A system having executable instruction codes embedded on a medium for automatically initiating a network-based search from within a document displayed by a document viewer, the document comprising one or more objects, the system comprising:

a first set of instruction codes for receiving a user designation of at least one object of the document;

a second set of instruction codes for automatically providing a search engine address and a query command to a browser in response to the user designation of the at least one object;

a third set of instruction codes for automatically providing the browser with the at least one designated object;

wherein the browser automatically submits the query command and the at least one designated object to a search engine corresponding to the search engine address;

wherein the document comprises an image; and wherein the search term designation module comprises:
a fourth set of instruction codes for receiving a user selection of a portion of the image; and
a fifth set of instruction codes for performing optical character recognition on the selected portion of the image to recognize therein the at least one designated object.

41. A system having executable instruction codes embedded on a medium for automatically initiating a network-based search from within a document displayed by a document viewer, the document comprising one or more objects, the system comprising:

a first set of instruction codes for receiving a user designation of at least one object of the document;

a second set of instruction codes for automatically providing a search engine address and a query command to a browser in response to the user designation of the at least one object;

a third set of instruction codes for automatically providing the browser with the at least one designated object;

wherein the browser automatically submits the query command and the at least one designated object to a search engine corresponding to the search engine address;

wherein the second set of instruction codes comprises a fourth set of instruction codes for automatically directing a browser to the search engine;

wherein the fourth set of instruction codes comprises a fifth set of instruction codes for displaying to a user a context-sensitive menu including at least one choice of a search engine to perform the network-based search and to receive a user selection of a search engine from the context-sensitive menu; and wherein the fifth set of instruction codes comprises a sixth set of instruction codes for automatically making c selection of the at least one choice of a search engine to be included in the context-sensitive menu based on the at least one user-designated object.

* * * * *

UNITED STATES PATENT AND TRADEMARK OFFICE
CERTIFICATE OF CORRECTION

PATENT NO. : 6,785,670 B1
DATED : August 31, 2004
INVENTOR(S) : Chiang et al.

It is certified that error appears in the above-identified patent and that said Letters Patent is hereby corrected as shown below:

Title page,
Item [56], References Cited, U.S. PATENT DOCUMENTS, "6,349,595 B1" should read -- 6,349,295 B1 --

Column 11,
Line 6, please replace "automotically" with -- automatically --;
Line 56, please replace "Internet-base" with -- Internet-based --;

Column 12,
Line 45, please replace "comprises on image" with -- comprises an image --;

Column 13,
Line 35, please replace "claim 24" with -- claim 38 --;

Column 14,
Line 63, please replace "selection of least one" with -- selection of at least one --; and Column 16,
Lines 45-46, please replace "mak-ing c selection" with -- making a selection --.

Signed and Sealed this

Twenty-eighth Day of June, 2005

JON W. DUDAS
*Director of the United States Patent and Trademark Office*